US008425192B2

(12) United States Patent
Hoyland et al.

(10) Patent No.: US 8,425,192 B2
(45) Date of Patent: Apr. 23, 2013

(54) ANNULUS FILLER

(75) Inventors: Mathew Ashley Charles Hoyland, Chesterfield (GB); Dale Edward Evans, Derby (GB)

(73) Assignee: Rolls-Royce PLC (GB)

( * ) Notice: Subject to any disclaimer, the term of this patent is extended or adjusted under 35 U.S.C. 154(b) by 511 days.

(21) Appl. No.: 12/779,442

(22) Filed: May 13, 2010

(65) Prior Publication Data

US 2010/0290910 A1 Nov. 18, 2010

(30) Foreign Application Priority Data

May 18, 2009 (GB) .................................. 0908422.9

(51) Int. Cl.
*B64C 11/16* (2006.01)

(52) U.S. Cl.
USPC .................... 416/190; 416/193 R; 416/214 A

(58) Field of Classification Search .................. 416/190, 416/191, 193 A, 193 R, 204 A, 209, 214, 416/220 R, 219 R
See application file for complete search history.

(56) References Cited

U.S. PATENT DOCUMENTS

| | | | | |
|---|---|---|---|---|
| 5,131,814 | A | 7/1992 | Przytulski et al. | |
| 6,726,452 | B2 * | 4/2004 | Strassberger et al. | 416/190 |
| 6,929,453 | B2 * | 8/2005 | Kite et al. | 416/220 R |
| 2005/0129522 | A1 | 6/2005 | Kite et al. | |

FOREIGN PATENT DOCUMENTS

| | | | |
|---|---|---|---|
| EP | 1881160 | A2 | 1/2008 |
| EP | 2090749 | A2 | 8/2009 |
| EP | 2108786 | A2 | 10/2009 |
| FR | 1341910 | A | 9/1963 |
| GB | 1331209 | | 9/1973 |
| GB | 2171151 | A | 8/1986 |

* cited by examiner

*Primary Examiner* — Edward Look
*Assistant Examiner* — Christopher C Williams
(74) *Attorney, Agent, or Firm* — McCormick, Paulding & Huber LLP

(57) ABSTRACT

An annulus filler for mounting to a rotor disc of a gas turbine engine bridges the gap between adjacent disc blades. The annulus filler has a lid defining part of an airflow surface for air drawn through the engine; a separate support connectable to the lid and to the rotor disc with an engagement portion of the support extending radially past a substantially adjacent region of the lid; and a retainer configured to interconnect the lid and the support by engaging each engagement portion of the support and adjacent regions of the lid, the retainer defining another part of the airflow surface. The annulus filler can be configured to allow mounting to the rotor disc, where the support is connected to the rotor disc without the lid, and then the lid is mounted to the support such that each engagement portion remains visible from the lid's radially outermost side.

17 Claims, 8 Drawing Sheets

ANNULUS FILLER

CROSS REFERENCE TO RELATED APPLICATION

This application is entitled to the benefit of British Patent Application No. GB 0908422.9, filed on May 18, 2009.

FIELD OF THE INVENTION

The present invention relates to annulus fillers for bridging gaps between adjacent blades of a gas turbine engine stage.

BACKGROUND OF THE INVENTION

Conventionally, each compressor rotor stage of a gas turbine engine comprises a plurality of radially extending blades mounted on a rotor disc. The blades are mounted on the disc by inserting a root portion of the blade in a complementary retention groove in the outer face of the disc periphery. To ensure a smooth radially inner surface for air to flow over as it passes through the stage, annulus fillers are used to bridge the spaces between adjacent blades. Typically, seals between the annulus fillers and the adjacent fan blades are also provided by resilient strips bonded to the annulus fillers adjacent the fan blades.

Annulus fillers of this type are commonly used in the fan stage of gas turbine engines. The fillers may be manufactured from relatively lightweight materials and, in the event of damage, may be replaced independently of the blades. The fillers are spaced from the rotor disc and define a hollow cavity that is separated from the air flow passage by the smooth inner surface defined by the annulus filler.

It is known to provide annulus fillers with features for removably attaching them to the rotor disc. For example, it has been proposed to provide annulus fillers with axially spaced hook members, the hook members sliding into engagement with respective parts of the rotor disc. FIG. 1 shows an example of such an annulus filler viewed from the side, and FIG. 2 shows the annulus filler fitted to the rotor disc as viewed in transverse cross-section.

In use, the upper surface or lid 2 of the annulus filler 1 bridges the gap between two adjacent fan blades 3 (one of which is shown in outline if FIG. 2) and defines the inner wall of the flow annulus of a fan stage. The annulus filler 1 is mounted on a fan disc 4 by two hook members 5, 6 respectively towards the forward and rearward ends of the annulus filler 1. The hook members are configured to engage with outwardly directed hooks provided on the fan disc 4. The annulus filler is also attached to a support ring 7 by a retention flange 8 provided at the forward end of the annulus filler. Along its rear edge, the annulus filler is provided with a rear lip 9 which is configured to fit under a rear fan seal 10 located axially behind the rotor disc 4 to limit deflection under running conditions. Similarly, the front edge of the annulus filler defines a front lip 11 which is configured to fit under a spinner fairing 12 located axially ahead of the annulus filler. The two opposed side faces 13, 14 of the annulus filler are provided with respective seal strips (not shown) and confront the aerofoil surfaces of the adjacent fan blades 3 in a sealing manner.

As illustrated in more detail in FIG. 3, the retention flange 8 carries a forwardly extending spigot or pin 15. The spigot or pin 15 is arranged for engagement within a corresponding aperture or recess provided in the support ring 7. At a position circumferentially adjacent the spigot or pin 15, the retention flange is also provided with a mounting aperture 16 which is arranged for co-alignment with a corresponding mounting aperture (not shown) provided through the support ring 7. The co-aligned mounting apertures are sized to receive a mounting bolt. Thus, it will be appreciated that the retention flange 8 is pinned and bolted to the front support ring 7.

FIG. 4 illustrates the typical form of the rear hook member 6, as viewed from behind. As can be seen, the hook member defines an arcuate channel 17. The channel 17 is curved in such a manner as to be centred on the rotational axis of the engine (not shown), and cooperates with a correspondingly arcuate hook on the rotor disc 4. The front hook member 5 has a similar arcuate configuration.

A problem which has been experienced with prior art annulus fillers of the general type described above is that of reliable installation during engine assembly. As will be appreciated by those of skill in the art, the annulus filler must be fitted after the radially extending fan blades have been attached to the rotor disc. This means when the fitter then installs the annulus fillers between adjacent blades, his or her line of sight is obstructed by the presence of the fan blades. Also, the unitary construction of the annulus filler exacerbates this problem, because the filler lid 2 also obstructs the fitter's view when attempting to engage the hook members 5, 6 with the rotor disc 4. Misassembly of the rear hook member 6 has been found to be a particular problem in this regard and has been attributed to the release of annulus fillers in operation.

Annulus fillers of the prior-art type described above are self-loading in the sense that, as a rotating component, the majority of forces on the filler are generated by its own mass. This can be modelled as a near to radial force acting through the centre of gravity of the annulus filler. However, in the event of a bird-strike, or a fan blade otherwise becoming detached from the rotor (i.e. a so-called "fan-blade-off" event), the blades can apply tangential pushing forces to the adjacent annulus fillers thereby tending to pinch the annulus fillers between the blades as the blades pivot tangentially in their retention grooves. This can cause the annulus fillers to become detached from the rotor. In this regard, it is to be noted that a bird-strike or fan-blade-off event creates substantial imbalance in the rotor, and so even the remaining fan blades can deflect considerably due to their tips impinging on the outer casing surrounding the rotor. Thus it is not unknown to lose annulus fillers from circumferential positions well away from the primary release blade.

It has been found that the above-described configuration of annulus filler can increase the likelihood of the filler failing under the action of the tangential forces applied to it by the adjacent fan blades. Due to the curved nature of the interface between the hook members 5, 6 on the annulus filler and the cooperating hooks formed on the rotor disc 4, the natural tendency of an annulus filler pushed from the side by an adjacent fan blade is to move rotationally relative to the disc, about the engine axis. However, because the front end of the filler is securely fixed by being pinned and bolted to the support ring, the front region of the filler is not permitted to deflect in this manner. The result is that the annulus filler becomes twisted along its length, which can lead to the filler fracturing between the retention flange 8 and the front hook member 5. As will be appreciated, failure of annulus fillers in this manner is problematic as it increases the amount of shrapnel moving around inside engine during a bird-strike or fan-blade-off event, which can have serious consequences.

SUMMARY OF THE INVENTION

It is therefore an object of the present invention to provide an improved annulus filler.

According to a first aspect of the present invention, there is provided an annulus filler for mounting to a rotor disc of a gas turbine engine and for bridging the gap between two adjacent blades attached to the rotor disc, the annulus filler having:

a lid defining part of an airflow surface for air drawn through the engine;

a separate support which is connectable to the lid and to the rotor disc so as to support the lid on the rotor disc with at least one engagement portion of the support extending radially past a substantially adjacent region of the lid; and a separate retainer configured to interconnect the lid and the support by engaging the or each engagement portion of the support and adjacent regions of the lid, the retainer defining another part of said airflow surface.

Preferably, the lid and the support are configured to allow a procedure for mounting the annulus filler to the rotor disc, the procedure having a first step in which the support is connected to the rotor disc without the lid, and a subsequent second step in which the lid is mounted to the support such that the or each engagement portion remains visible from the radially outermost side of the lid.

The lid, the support and the retainer are preferably configured to allow a subsequent third mounting step in which said retainer is engaged with the or each said engagement portion of the support and adjacent regions of the lid.

Preferably, at least one aperture or recess is formed through the lid, the or each aperture or recess being configured to receive therethrough a respective said engagement portion.

A plurality of said apertures may be formed through the lid. The apertures may be provided in substantially axial alignment.

Preferably, the or each said aperture is provided within a recessed channel formed in the lid.

In an arrangement incorporating the above-mentioned channel, the retainer is preferably configured for engagement within said channel in a sliding manner, in a substantially axial direction.

The lid may be configured such that said channel comprises a pair of opposed undercut side edges, and said slider may have a pair of opposed side edges defining respective lips for engagement under said undercut side edges.

Preferably, the or each engagement portion of the support also comprises a pair of opposed undercut edges configured for alignment with the undercut side edges of the lid and for engagement with the lips of the slider.

In a preferred arrangement, lid is formed from a first material and the support is formed from a different second material.

More particularly, the lid is preferably formed from a plastics material. The support is preferably formed from a metal material.

The support preferably comprises a frame formed from sheet metal, and the or each said engagement portion may be formed as a metal block connected to said frame.

Other aspects of the invention provide a lid for the annulus filler of the first aspect, a support for the annulus filler of the first aspect, and a retainer for the annulus filler of the first aspect.

According to another aspect of the present invention, there is provided a stage for a gas turbine engine having: a rotor disc; a plurality of circumferentially spaced apart blades attached to the rotor disc; and a plurality of annulus fillers according to the first aspect. Optional features of the first aspect apply, as appropriate, to this aspect also.

BRIEF DESCRIPTION OF THE DRAWINGS

So that the invention may be more readily understood, and so that further features thereof may be appreciated, an embodiment of the invention will now be described by way of example with reference to the accompanying drawings in which.

DETAILED DESCRIPTION OF THE PREFERRED EMBODIMENTS

Figure 1:
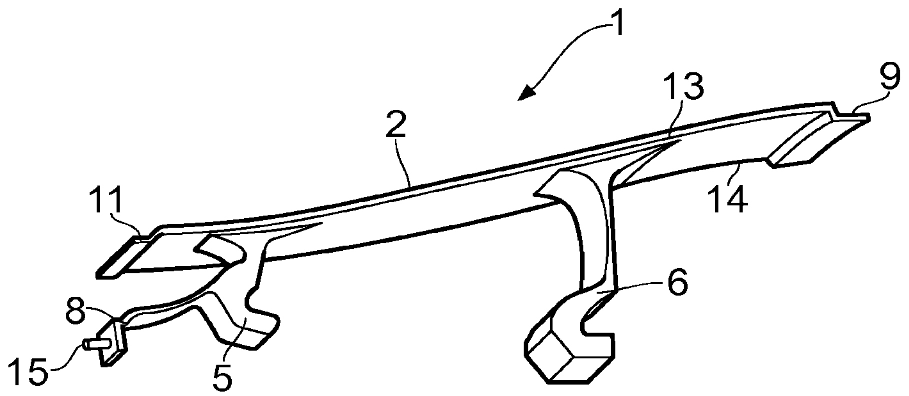
FIG. 1 Prior Art
FIG. 1 shows a prior-art annulus filler, viewed from the side.
Figure 2:
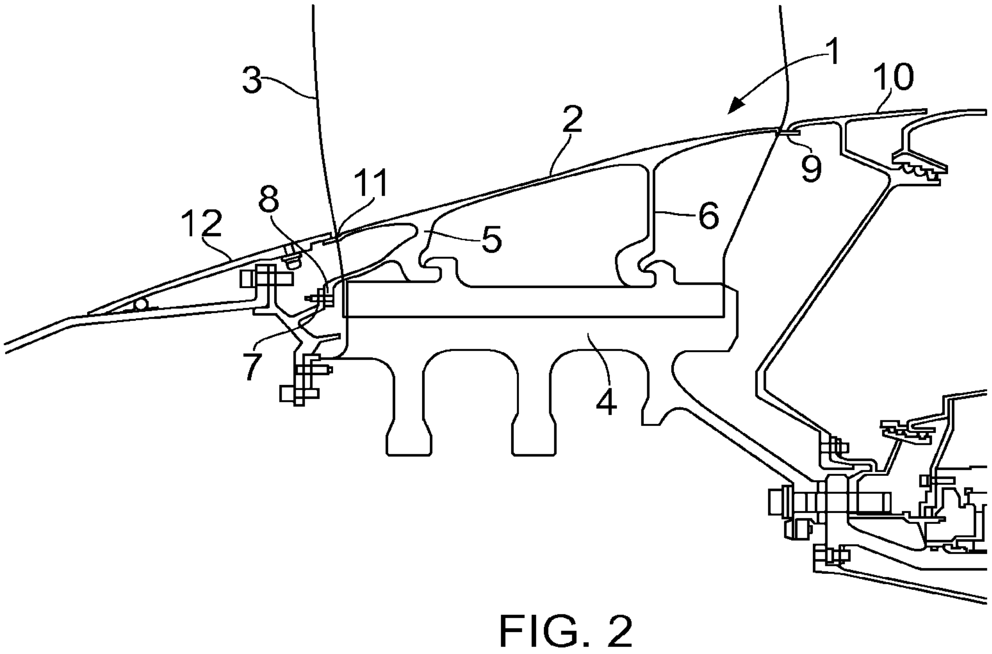
FIG. 2 Prior Art
FIG. 2 shows the annulus filler of FIG. 1, installed in a gas turbine engine.
Figure 3:
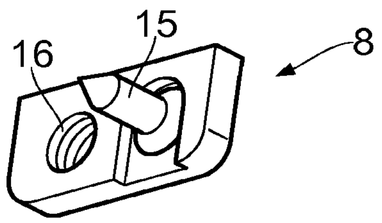
FIG. 3 Prior Art
FIG. 3 is an enlarged view of part of the annulus filler shown in FIGS. 1 and 2, as viewed from the front.
Figure 4:
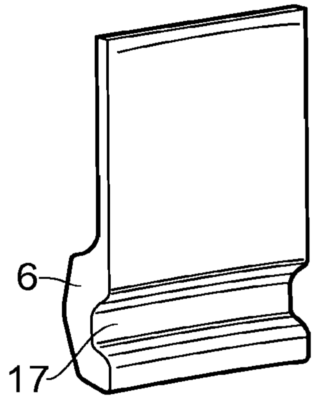
FIG. 4 Prior Art
FIG. 4 is an enlarged view of another part of the annulus filler shown in FIGS. 1 and 2, as viewed from the rear.
Figure 5:
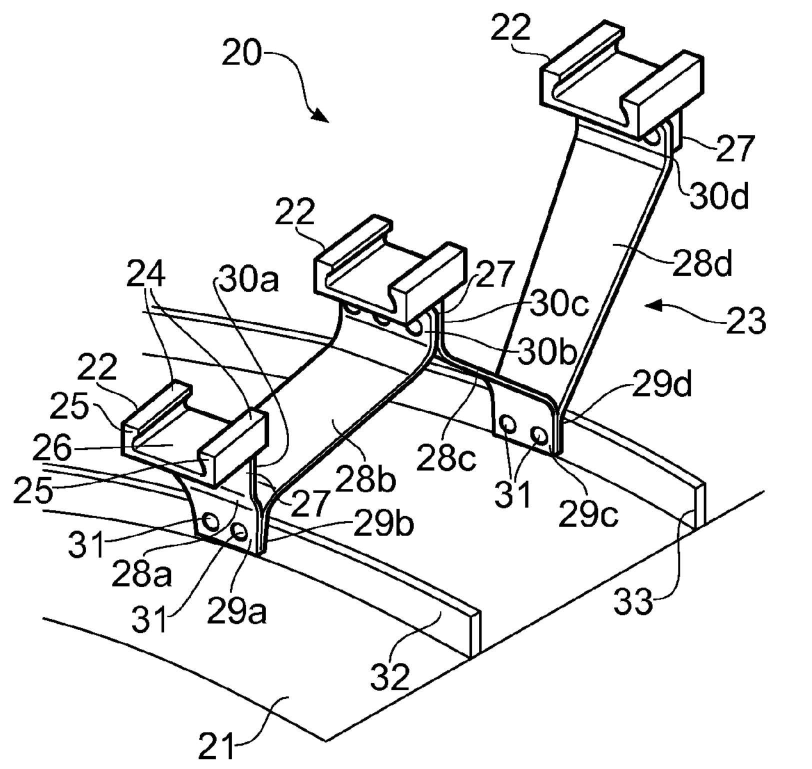
FIG. 5 is a perspective view of a support forming part of an annulus filler in accordance with a first embodiment of the present invention.

Referring now in more detail to FIG. 5, there is illustrated a support assembly 20, which forms part of an annulus filler in accordance with the present invention. The support assembly 20 is shown connected to the outer periphery of a rotor disc 21 of a gas turbine engine such as, for example, a fan disc. The support assembly 20 comprises three support blocks 22, each of which has substantially identical form. The three support blocks are arranged in substantially axial alignment and are interconnected via a supporting frame 23. The support blocks 22 are generally rectangular in form and are formed from metal, most preferably titanium 6-4 alloy. The support blocks 22 can be extruded or metal injection moulded to near net shape. Each support block 22 has a pair of opposed engagement portions 24, each of which is defined by an opposing side edge carrying a substantially tangentially directed lip 25. Each engagement portion 24 is fonned so as to have an undercut recess formed radially below the respective lip 25. As can be seen, each support block 22 thus defines a dovetail slot indicated generally at 26. As also illustrated in FIG. 5, each support block 22 is formed with a downwardly extending mounting flange 27.

The support frame 23, which serves to interconnect and support the blocks 22, is formed from a number of discrete sheet metal components 28*a*, 28*b*, 28*c*, 28*d*, each of which has a substantially Z-shaped configuration terminating with a pair of substantially parallel flanges 29, 30. The sheet metal components 28 are arranged in pairs. Accordingly, the forwardmost component 28*a* is arranged in a pair with the adjacent component 28*b* such that the inner flanges 29*a*, 29*b* of the two components abut one another and are interconnected, for example by welding. The outer flange 30*a* of the forwardmost component 28*a* is connected to the mounting flange 27 of the forwardmost support block 22 via securing bolts, rivets or other appropriate means. Similarly, the outer flange 30*b* of the component 28*b* is connected to the forward face of the axially central support block 22. It will be noted that the paired components 28*a*, 28*b* thus diverge from one another and are of unequal length, such that the axially central support block 22 is mounted radially above the forward support block 22. Similarly, the other two sheet metal components 28*c*, 28*d* are arranged in a pair and interconnected via their abutting inner flanges 29*c*, 29*d*. Here, it is to be noted that the inner flanges 29*a*, 29*b*, 29*c*, 29*d* of all four of the components 28*a*, 28*b*, 28*c*, 28*d* are arranged in radial alignment. The component 28*c* extends axially forwardly and radially outwardly from its inner flange 29*c* and is connected, via its outer flange 30*c*, to the rear face of the mounting flange 27 carried by the central support block 22. The rearmost component 28*d* extends axially rearwardly and radially outwardly from its inner flange 29*d* and is connected via its outer flange 30*d* to the mounting flange 27 of the axially rearmost support block 22. Again, it will be noted that the rear pair of components 28*c*, 28*d* are of unequal length such that the rearmost component 28*d* extends radially past the central support block 22. It is thus to be appreciated that the support frame 23 is configured to interconnect and support the three blocks 22 so that they are in substantially axial alignment with one another but are radially offset.

The abutting inner flanges 29*a*, 29*b* and 29*c*, 29*d* of each pair of sheet metal components are provided with co-aligned mounting apertures 31. via which the paired flanges may be bolted or otherwise secured to respective circumferential flanges 32, 33 provided around the periphery of the rotor disc 21.

In order to mount the annulus filler of the present invention to the rotor disc 21, the above-described support assembly 20 is initially connected to the rotor disc 21 in the manner described above. It is to be appreciated that this initial assembly step may be carried out in the absence of the radially extending rotor blades and, as such, the person fitting the support assembly 20 to the rotor disc 21 will have substantially unrestricted view of the process, thereby facilitating easy and reliable connection. Once the support assembly 20 of each annulus filler has been connected in the appropriate position around the periphery of the rotor disc 21, the rotor blades can then be assembled around the rotor in a conventional manner, without the need to remove the support assembly 20. It is thus to be appreciated that the above-described support assembly 20 is specifically configured so as to be connectable to the rotor disc 21 in the absence of the rotor blades, thereby reducing the possibility of the fitter incorrectly connecting the assembly to the rotor disc 21 as a result of poor visibility caused by the presence of the rotor blades.

Figure 6:
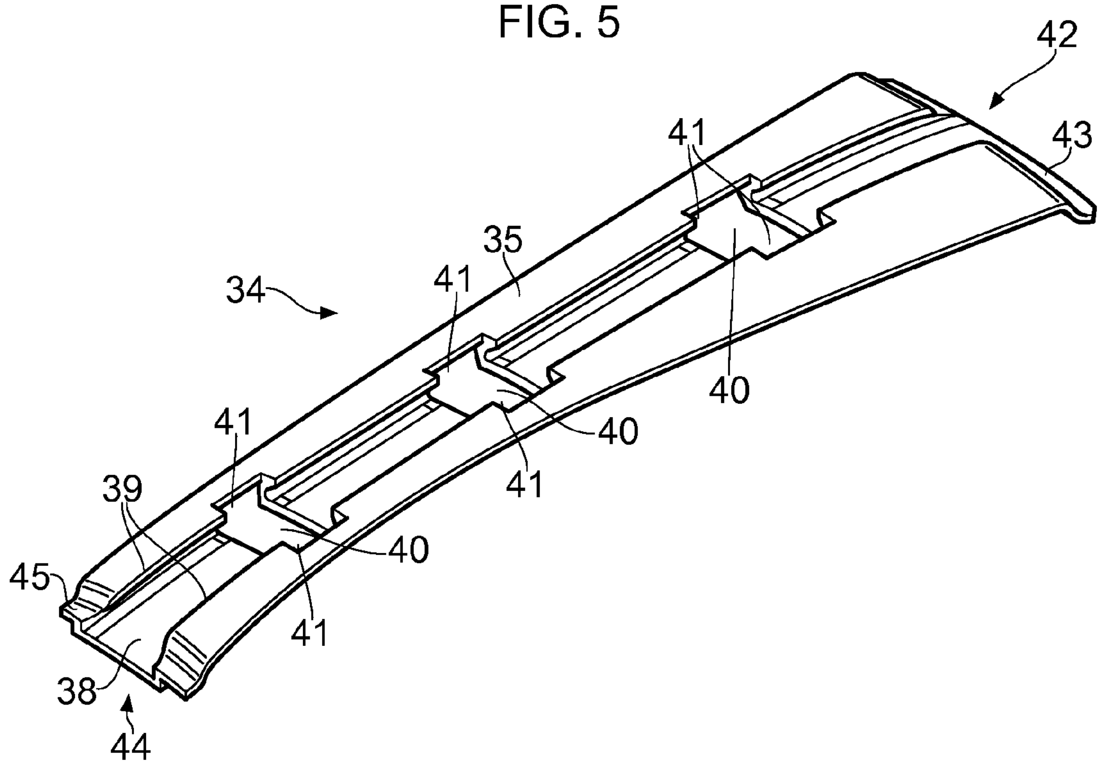
FIG. 6 is a perspective view of a lid forming another part of an annulus filler in accordance with the first embodiment.
Figure 7:
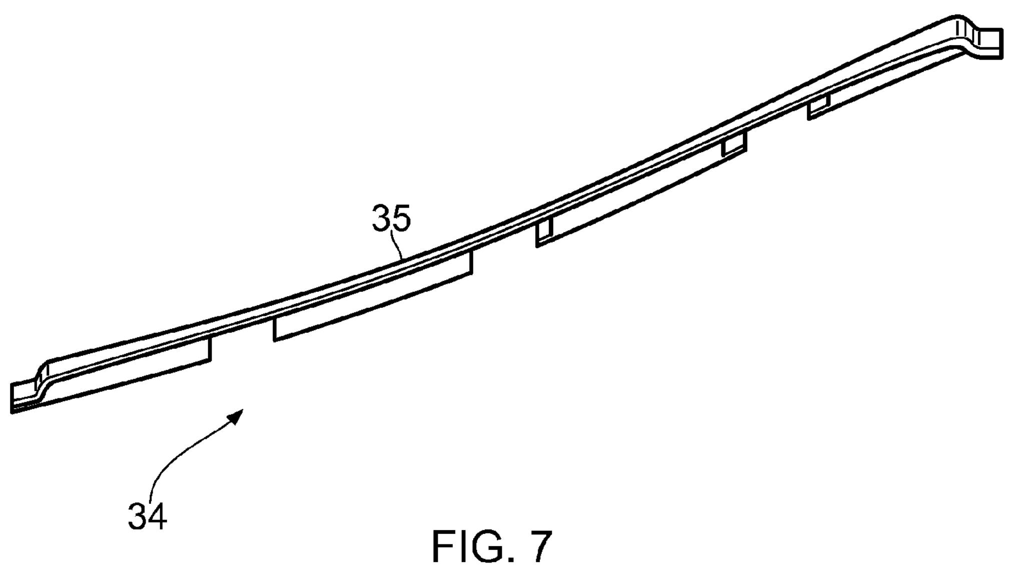
FIG. 7 is a circumferential side view of the lid shown in FIG. 6.
Figure 8:
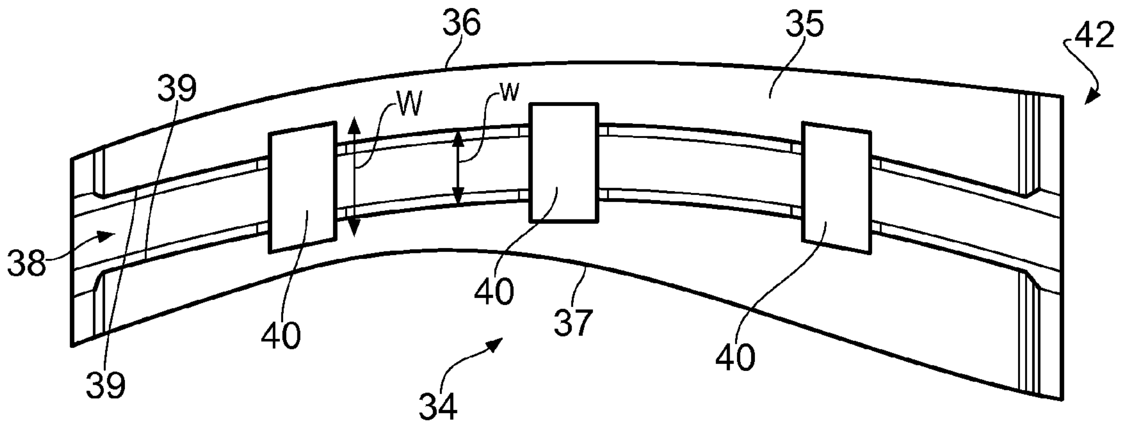
FIG. 8 is a radial view from above of the lid shown in FIGS. 6 and 7.

Turning now to consider FIGS. 6 to 8, there is illustrated a separate lid component 34 of the annulus filler which is preferably formed from plastic material. For example, material for the lid may be a carbon- or glass-fibre reinforced thermoplastic, such as Torion™ 5030/7030 (polyamide-imide) from Solvay Advanced Polymers. Such a part can be formed by injection or compression moulding. An alternative is to form the lid from fibre reinforced epoxy, for example by compression moulding. Injection moulding generally requires short reinforcing fibres. Compression moulding could use longer fibres.

The lid 34 defines a radially outermost, generally arcuate, surface 35 which, in use, defines part of an airflow surface for air drawn through the gas turbine engine. As illustrated most clearly in FIG. 8, the lid 34 has one side edge 36 of substantially concave form configured to lie generally adjacent the pressure surface of an adjacent aerofoil blade, and an opposed generally convex side edge 37 configured to lie adjacent the suction surface of a neighbouring aerofoil blade. The opposed side edges 36, 37 are provided with respective seal strips (not shown) as is conventional, in order to seal against the adjacent surfaces of the rotor blades.

As also illustrated most clearly in FIGS. 6 and 8, the lid 34 is provided with a generally axially extending recessed channel 38, the channel having a curved configuration in order to conform to the generally curved profile of the lid. The channel 38 comprises a pair of opposed undercut side edges 39 and thus has a dovetail configuration similar to that of the support blocks 22 of the support assembly 20.

The lid 34 is provided with three generally rectangular spaced apart apertures 40 which extend completely through the lid in a radial sense. Having particular regard to FIGS. 6 and 8, it will be seen that the apertures 40 have a circumferential width W which is somewhat larger than the circumferential width w between the opposing side edges 39 of the channel, noting that w is substantially constant along the axial length of the channel 38. As thus illustrated most dearly in FIG. 6, it will be seen that the opposed undercut side edges 39 are provided with rectangular recesses 41 at the position of each aperture 40.

Along its rear edge 42, the lid 34 is provided with a rear lip 43 which is configured to fit under a rear fan seal (not shown) located axially behind the rotor disc 21. Similarly, the front edge 44 of the lid 34 defines a front lip 45 which is configured to fit under a spinner fairing (not shown) or the like, located axially ahead of the annulus filler.

It is to be noted that the apertures 40 formed through the lid 34 are sized and shaped so as to receive respective support blocks 22 therein, as will be described in more detail below.

Figure 9:
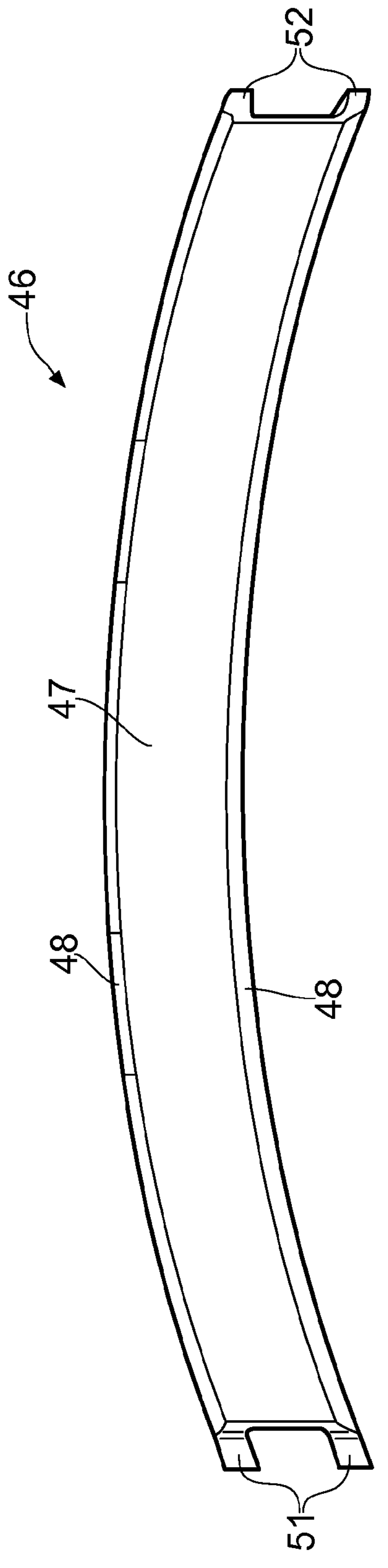
FIG. 9 is a radial view from above of a retainer forming a further part of an annulus filler in accordance with the first embodiment.
Figure 10:
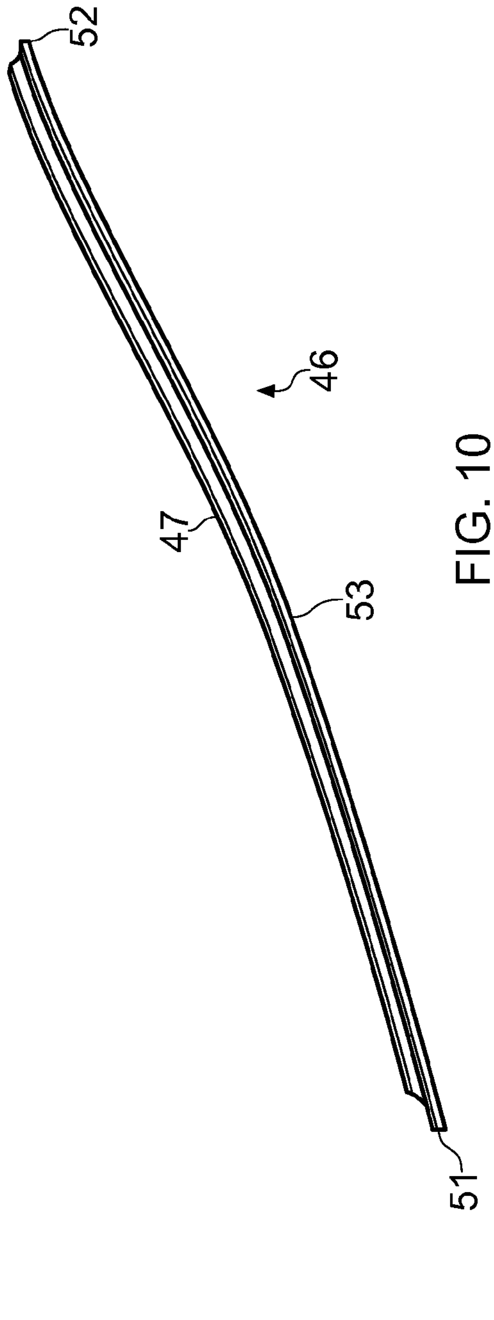
FIG. 10 is a circumferential side view of the retainer shown in FIG. 9.

Turning now to consider FIGS. 9 and 10, there is illustrated a separate retainer component 46 which, as will be described in more detail below, forms a further part of the annulus filler of the present invention. The retainer 46 has a curved profile in both a radial sense (as illustrated in FIG. 10) and a circumferential sense (as illustrated in FIG. 9) corresponding to the profile of the recessed channel 38 formed in the lid 34. The retainer 46 is thus configured for sliding engagement, in a substantially axial direction, within the recessed channel 38 of the lid. Accordingly, it will be noted that the radially outer surface 47 of the retainer 46 is generally smooth so as to define a further region of the airflow surface for air drawn through the engine when assembled as part of the annulus filler of the present invention. The opposing side edges 48 of the retainer 46 are chamfered to form lips conforming to the profile of the undercut recesses of the dovetail slot 26 formed in the support blocks 22, and also the undercut profile of the recessed channel 38 provided along the lid 34.

A pair of spade-like projections 51 extend forwardly from the forward edge of the retainer 46, and a similar pair of projections 52 extend rearwardly from the rear edge of the retainer.

Figure 11:
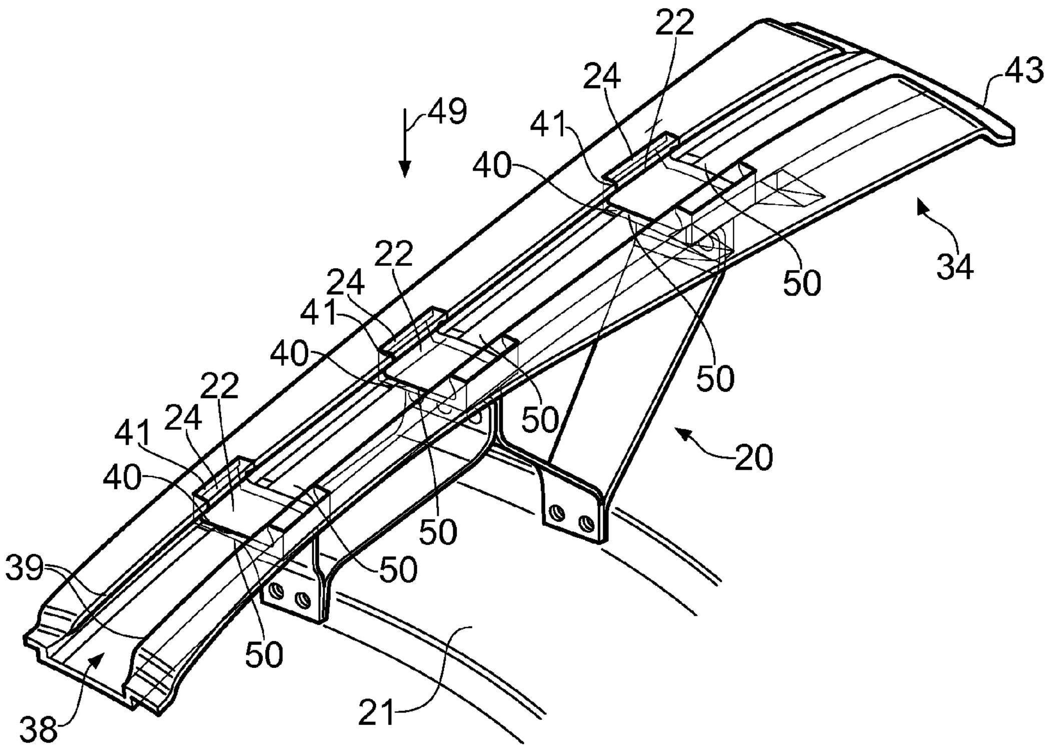
FIG. 11 is a perspective view showing the lid of FIGS. 6 to 8 mounted on the support of FIG. 5, during a procedure to mount the annulus filler to a rotor disc.

FIG. 11 illustrates the support assembly 20 mounted in position on the rotor disc 21 as described above. Following the initial step of connecting the support assembly 20 to the rotor disc 21, the lid 34 is then mounted on the support assembly 20. This is achieved by offering up the lid 34 to the support assembly 20 in a generally radial direction illustrated schematically by arrow 49, between adjacent rotor blades (not shown), such that each support block 22 is aligned with and thus received within a respective aperture 40 formed through the lid. As the lid 34 is mounted on the support assembly 20 in this manner, the rear lip 43 of the lid will be hooked under the rear fan seal (not shown).

As will be appreciated, a person fitting the lid 34 to the pre-assembled support structure 20 will be able to view the support blocks 22 through the corresponding apertures 40, generally along the radial insertion line 49, thereby allowing accurate positioning of the lid on the support assembly 20. The apertures 40 thus prevent the underlying sub-assembly 20 from being completely obscured by the lid 34 as the lid is offered up to the support assembly 20, thereby permitting easy and correct assembly of the lid onto the support assembly 20 as illustrated in FIG. 11. As will also be appreciated from FIG. 11, the lid 34 is mounted on the underlying sub-assembly 20 such that the engagement portions 24 of each support block 22 are received within and engage respective recesses 41 defined along the undercut side edges 39 of the channel 38. The engagement portions 24 thus extend radially past adjacent regions 50 of the channel formed in the lid when received and engaged within the recesses 41.

Figure 12:
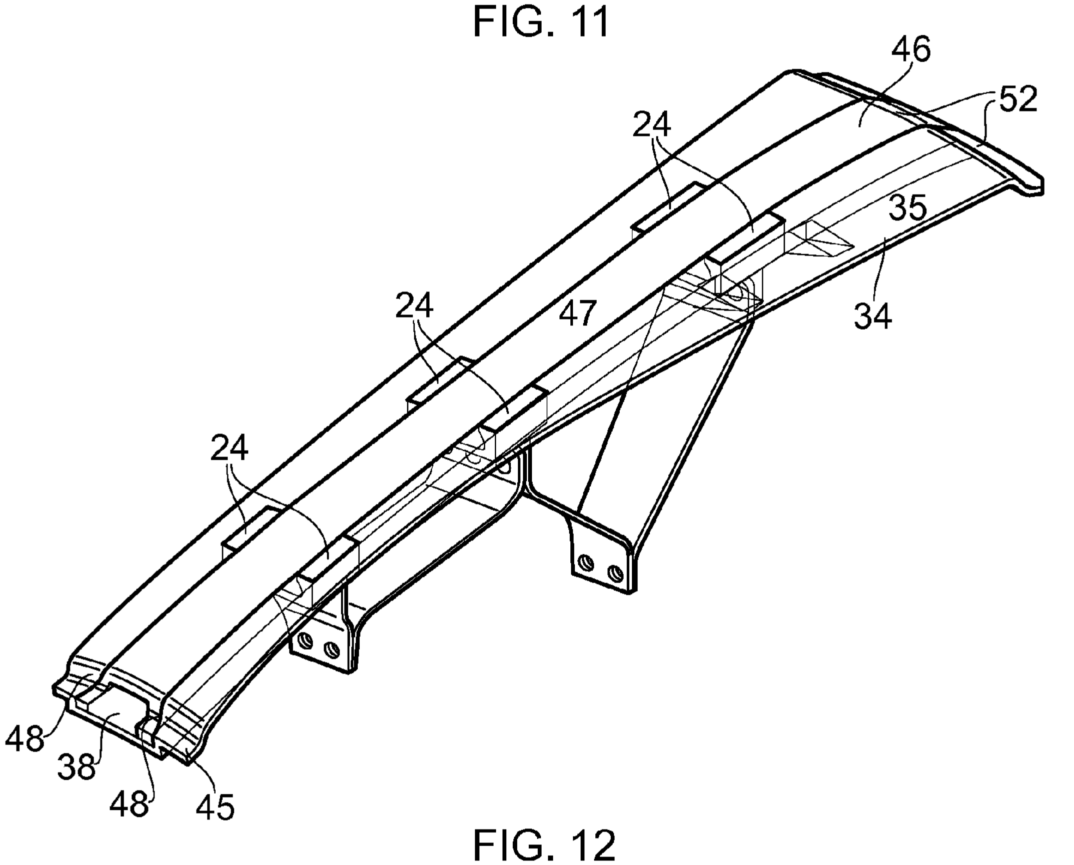
FIG. 12 is a perspective view corresponding generally to that of FIG. 11, showing the retainer of FIGS. 9 and 10 engaged with the support and the lid, in order to interconnect the support and the lid.

FIG. 12 illustrates the retaining slider 46 having been inserted axially within the channel 38 such that its chamfered side lips 48 are received within and engage against the undercut side edges 39 of the channel, whilst also engaging in a similar manner beneath the lips 25 engagement portions 24 of the support blocks 22. The undersurface 53 of the retainer 46 engages against the regions of the channel bottom surface 50 lying substantially adjacent the engagement portions 24. The retainer 46 thus locks the annulus filler assembly together, effectively serving to securely interconnect the lid 34 and the underlying support assembly 20. The retainer 46 engages below the undercut engagement portions 24 of the support assembly, and also engages against generally adjacent regions 50 of the channel 38.

As illustrated in FIG. 12, the radially outer surface 47 of the retainer 46 lies substantially flush with the radially outermost surface 35 of the lid 34, both of these surfaces in combination thus defining an airflow surface for air drawn through the engine. Similarly, the radially outermost surfaces of the engagement portions 24 are substantially flush with the outermost surfaces 47, 35 of the retainer 46 and the lid 34.

As also illustrated in FIG. 12, the forward projections 51 of the retainer have a profile which conforms to the profile of the front lip 45 of the lid, and so the projections are configured for retention under the spinner fairing or the like together with the front lip. Similarly, the rear projections 52 have a profile which conforms to the profile of the rear lip 43, and so are received under the rear fan seal together with the rear lip 43.

As will be appreciated, the above-described annulus filler is configured to allow a procedure for mounting the annulus filler to the rotor disc 21, the procedure having a first step in which the support assembly 20 is connected to the rotor disc 21 in the absence of the lid 34, a subsequent second step in which the lid 34 is mounted to the support 20 such that each engagement portion 24 remains visible through a respective aperture 40 from the radially outermost side of the lid 34, and a third step in which the retainer 46 is engaged with each said engagement portion 24 of the support 20 and adjacent regions 50 of the lid. The annulus filler can thus be fitted to the rotor in a manner in which the fitter can always see the engagement portions of the support assembly 20, thereby allowing accurate and reliable installation of the lid.

It has also been found that the above-described form of annulus filler has improved resistance to failure in the event of a bird-strike or a fan-blade-off event. In particular, the sheet metal construction of the support assembly 20 allows the support assembly to deflect in response to a tangential pushing force applied to the lid 34 by an adjacent rotor blade. This flexibility allows the lid 34 to rotate slightly along its length, thereby reducing its tendency to fracture. Furthermore, even in the event that the annulus filler should nevertheless fail, the likelihood is that only the lid 34 will fracture and hence become detached from the rotor, leaving the retainer 46 connected to the support assembly and the support assembly, in turn, connected to the rotor. This modular construction of the annulus filler thus means that in the event of failure, only the relatively light lid is released, thereby minimising the weight of resulting shrapnel.

Figure 13:
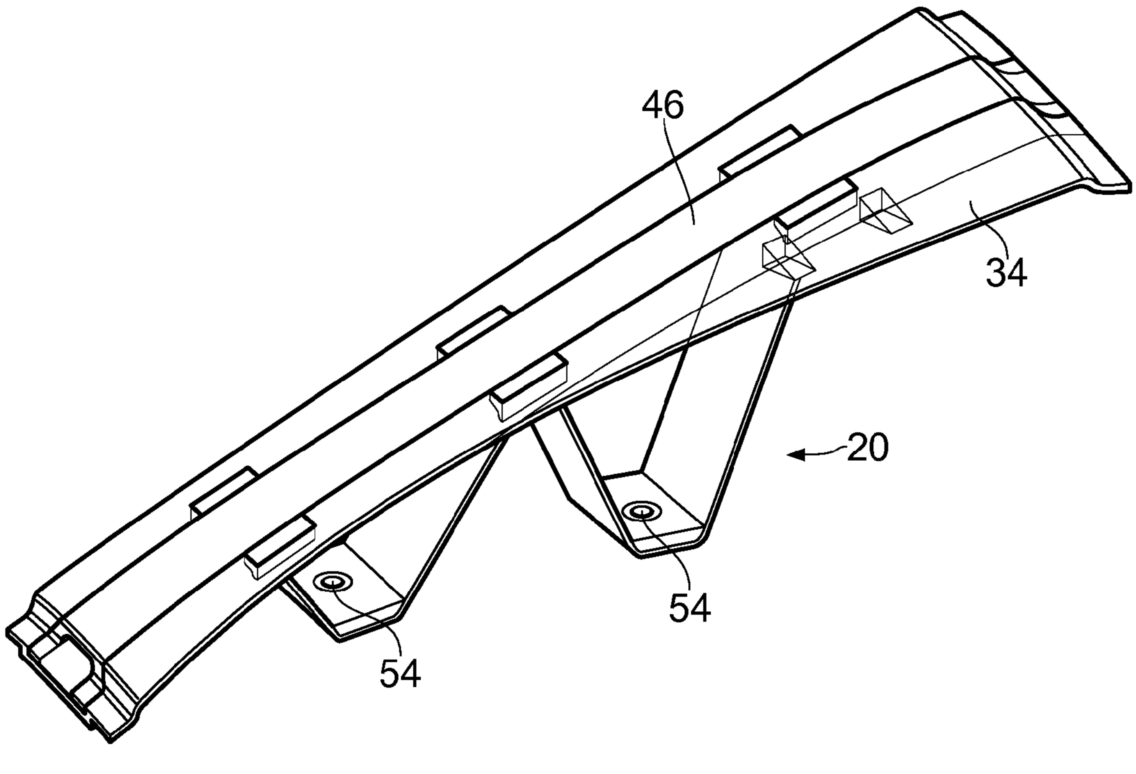
FIG. 13 is a perspective view similar to that of FIG. 12, but illustrating an assembled annulus filler in accordance with a second embodiment of the present invention.

It is to be appreciated that whilst the invention has been described above with reference to a specific embodiment, various alterations or modifications can be made without departing from the scope of the present invention. For example, FIG. 13 illustrates a modified arrangement incorporating a slightly different configuration of support assembly 20, but with a substantially identical lid 34 and retainer 46. In this arrangement, the support assembly 20 is configured for connection to the rotor disc 21 using radially extending, rather than axially extending securing, bolts (not shown) which pass through respective radially oriented mounting apertures 54. The support blocks 22 remain substantially unchanged.

Figure 14:
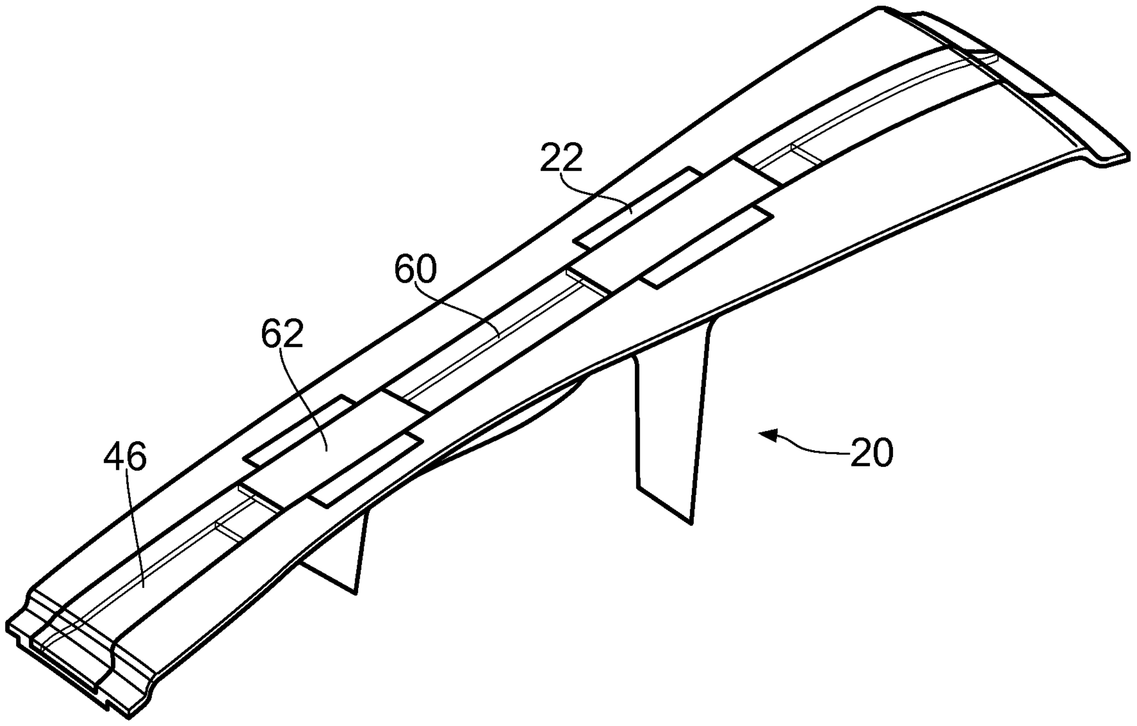
FIG. 14 is a perspective view similar to that of FIG. 13, but illustrating an assembled annulus filler in accordance with a third embodiment of the present invention.

FIG. 14 illustrates a further modified arrangement incorporating a slightly different configuration of support assembly 20 and retainer 46. The support assembly comprises simplified sheet metal legs secured to the rotor disc 21. The slider 46 is a hybrid of composite 60 and metal 62 with the metal portions, preferably titanium, engaging with the attachment blocks 22. Beneficially, the presence of the metal reduces the risk of the slider becoming detached from the attachment blocks.

When used in this specification and claims, the terms "comprises" and "comprising" and variations thereof mean that the specified features, steps or integers are included. The teens are not to be interpreted to exclude the presence of other features, steps or components.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. An annulus filler for mounting to a rotor disc of a gas turbine engine and for bridging the gap between two adjacent blades attached to the rotor disc, the annulus filler comprising:

a lid defining part of an airflow surface for air drawn through the engine;

a separate support which is connectable to the lid and to the rotor disc so as to support the lid on the rotor disc with at least one engagement portion of the support extending radially past a substantially adjacent region of the lid; and a separate retainer configured to interconnect the lid and the support by engaging the or each engagement portion of the support and adjacent regions of the lid, the retainer defining another part of said airflow surface.

2. An annulus filler according to claim 1, wherein the lid and the support are configured to allow a procedure for mounting the annulus filler to the rotor disc, the procedure having a first step in which the support is connected to the rotor disc without the lid, and a subsequent second step in which the lid is mounted to the support such that the or each engagement portion remains visible from the radially outermost side of the lid.

3. An annulus filler according to claim 2, wherein the lid, the support and the retainer are configured to allow a subsequent third mounting step in which said retainer is engaged with the or each said engagement portion of the support and adjacent regions of the lid.

4. An annulus filler according to claim 1, wherein at least one aperture or recess is formed through the lid, the or each aperture or recess being configured to receive therethrough a respective said engagement portion.

5. An annulus filler according to claim 4 comprising a plurality of said apertures formed through the lid.

6. An annulus filler according to claim 4, wherein the or each said aperture is provided within a recessed channel formed in the lid.

7. An annulus filler according to claim 6, wherein the retainer is configured for engagement within said channel in a sliding manner, in a substantially axial direction.

8. An annulus filler according to claim 7, wherein said lid is configured such that said channel comprises a pair of opposed undercut side edges, and said retainer has a pair of opposed side edges defining respective lips for engagement under said undercut side edges.

9. An annulus filler according to claim 8, wherein the or each engagement portion of the support also comprises a pair of opposed undercut edges configured for alignment with the undercut side edges of the lid and for engagement with the lips of the retainer.

10. An annulus filler according to claim 1, wherein the lid is formed from a first material and the support is formed from a different second material.

11. An annulus filler according to claim 1, wherein the lid is formed from a plastics material.

12. An annulus filler according to claim 1, wherein the support is formed from a metal material.

13. An annulus filler according to claim 12, wherein the support comprises a frame formed from sheet metal, and wherein the or each said engagement portion is formed as a metal block connected to said frame.

14. The annulus filler of claim 1 further comprising a lid.

15. The annulus filler of claim 1 further comprising a support.

16. The annulus filler of claim 1 further comprising a retainer.

17. A stage for a gas turbine engine the stage comprising:

a rotor disc;

a plurality of circumferentially spaced apart blades attached to the rotor disc; and a plurality of annulus fillers bridging the gaps between adjacent blades, each filler including a lid defining part of an airflow surface for air drawn through the engine;

a separate support which is connectable to the lid and to the rotor disc so as to support the lid on the rotor disc with at least one engagement portion of the support extending radially past a substantially adjacent region of the lid; and a separate retainer configured to interconnect the lid and the support by engaging the or each engagement portion of the support and adjacent regions of the lid, the retainer defining another part of said airflow surface.

* * * * *